(12) United States Patent
Hoshina et al.

(10) Patent No.: US 6,235,430 B1
(45) Date of Patent: May 22, 2001

(54) ALKALINE STORAGE BATTERY

(75) Inventors: Yasuko Hoshina, Hirakata; Miho Okamoto, Sakai; Noboru Ito; Munehisa Ikoma, both of Toyohashi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/936,055

(22) Filed: Sep. 23, 1997

(30) Foreign Application Priority Data

Sep. 25, 1996 (JP) .................................... 8-253301

(51) Int. Cl.[7] .................................................. H01M 2/16
(52) U.S. Cl. ........................................... 429/250; 429/249
(58) Field of Search ................................. 429/249, 250, 429/253, 254, 142

(56) References Cited

U.S. PATENT DOCUMENTS

| | | | |
|---|---|---|---|
| 3,573,994 | * 4/1971 | Field | 136/145 |
| 4,205,122 | * 5/1980 | Miura et al. | 429/144 |
| 4,529,677 | * 7/1985 | Bodendorf | 429/252 |
| 4,551,402 | * 11/1985 | Tamura et al. | 429/254 |
| 5,100,723 | * 3/1992 | Iwasaki et al. | 428/265 |
| 5,354,617 | * 10/1994 | Ikkanzaka et al. | 428/397 |
| 5,366,832 | * 11/1994 | Hayashi et al. | 429/249 |
| 5,401,594 | * 3/1995 | Schowobel et al. | 429/142 |
| 5,609,976 | * 3/1997 | Ueda et al. | 429/254 |
| 5,798,189 | * 8/1998 | Hayashida et al. | 429/101 |

FOREIGN PATENT DOCUMENTS

| | | |
|---|---|---|
| 4-036954 | 2/1992 | (JP) . |
| 6-215751 | 8/1994 | (JP) . |
| 8-138645 | 5/1996 | (JP) . |

* cited by examiner

*Primary Examiner*—Carol Chaney
(74) *Attorney, Agent, or Firm*—Akin, Gump, Strauss, Hauer & Feld, L.L.P.

(57) ABSTRACT

The present invention employs non-woven fabrics of an olefin resin comprising first filaments having diameters in a range of 3 to 10 μm as a main component and second filaments having diameters in a range of 20 to 40 μm contained at 1/200 to 1/10 of the whole filaments, as separators for separating positive electrodes from negative electrodes. The first filaments are formed by splitting the second filaments.

2 Claims, 1 Drawing Sheet

ALKALINE STORAGE BATTERY

BACKGROUND OF THE INVENTION

The present invention relates to an alkaline storage battery, particularly to an improvement in a separator used therein.

In recent years, alkaline storage batteries such as nickel-cadmium storage batteries and nickel-metal hydride storage batteries are attracting an attention as a power source for driving an electric vehicle since these batteries are expected to have a high output voltage, a high energy density and a long cycle life. Therefore, there increases a demand for further improvement in the performance of such alkaline storage batteries.

As one countermeasure for improving the performance of the alkaline storage batteries, a separator to separate a positive electrode from a negative electrode is investigated. For the separators in the alkaline storage batteries, a non-woven fabric composed of fibers made of an olefin resin such as polypropylene or an amide resin has been used. The separator made of the amide resin demonstrates a high liquid-absorbing property since the amide resin has a high hydrophilic property. However, the amide resin is low in alkali-resistance and heat-resistance. Therefore, the separator of the amide resin can not be stable for a long period at a high temperature which is assumed in a case when the battery is applied in an electric vehicle.

For that reason, investigations are mainly devoted to an improvement in the separator made of the olefin resin which is excellent in mechanical strength, alkali-resistance and heat-resistance. However, the separator made of the olefin resin demonstrates low liquid-absorbing property for an electrolyte since the olefin resin has low hydrophilic property. Therefore, various methods have been proposed for increasing the hydrophilic property and the liquid-absorbing property of the separator, thereby improving life characteristics and discharge characteristics of the battery.

For instance, according to Japanese Laid-Open Patent Publication Sho 62-115657 or Japanese Laid-Open Patent Publication Sho 64-57568, hydrophilic property of a separator made of an olefin resin poor in hydrophilic property is improved by a sulfonation treatment in which the separator is immersed in a concentrated sulfonic acid. However, the sulfonation treatment has a problem of lowering a mechanical strength of the separator because the treatment results in cutting of the carbon-carbon bonds in the resin.

Further, Japanese Laid-Open Patent Publication Hei 7-130392 proposes a method for improving a hydrophilic property of a separator by applying a surfactant which contain s sulfone groups to the separator. Although alkaline storage batteries configured with such separators demonstrate favorable characteristics at room temperature, they cannot have satisfactory life characteristic at high temperature because the surfactant gradually detaches from the surface of the separator.

Incidentally, another means for improving the discharge characteristic of an alkaline storage battery is investigated in making a separator thinner. The decreased thickness of the separator affects decreased electric and physical resistances between a positive electrode and a negative electrode, and also affects an increased proportion of a space occupied by the electrodes which participates in an electrochemical reaction of the battery. However, in a case of making the separator thinner by simply decreasing an amount or pieces of filaments per unit area (that is so called "METSUKE"), the liquid-absorbing property of the separator for an electrolyte is lowered, and the capacity of the battery is also decreased. In addition, since the mechanical strength of the separator is lowered, the separator is made liable to be damaged at the time of assembling the battery. Short-circuiting between the electrodes is also made liable to occur after assembling. In a case of making a diameter of the filament small while maintaining the pieces of the filaments to that of the conventional one, it is possible to reduce the thickness of the separator while maintaining the liquid-absorbing property for the electrolyte and the short-circuit resistance. However, there increases a hazard of lowering the mechanical strength and damaging the separator.

BRIEF SUMMARY OF THE INVENTION

The object of the present invention is to solve the above-mentioned problems, and to provide an alkaline storage battery which is excellent in reliability and performance at a high temperature. The alkaline storage battery is realized by employing a separator which has sufficient mechanical strength not resulting a damage at assembling or service and stably demonstrates an excellent electrolyte-absorbing property at a high temperature of 40° C. or higher.

An alkaline storage battery of the present invention comprises: an electrode group configured with positive electrodes and negative electrodes piled alternately, and separators interposed therebetween; and a battery case which accommodates the electrode group, wherein the separators are made of non-woven fabrics of an olefin resin comprising first filaments having diameters in the range of 3 to 10 $\mu$m as a main component and second filaments having diameters in the range of 20 to 40 $\mu$m contained at ½00 to ⅒ of the whole filaments.

It is preferable that the separators have sulfone groups introduced on their surfaces.

It is also preferable that the olefin resin is polypropylene.

According to the present invention, it is possible to provide a separator which stably demonstrates a high electrode-absorbing property even at a high temperature and has an excellent mechanical strength. By employing the separator, it becomes possible to provide an alkaline storage battery which has an excellent cycle life at a high temperature.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
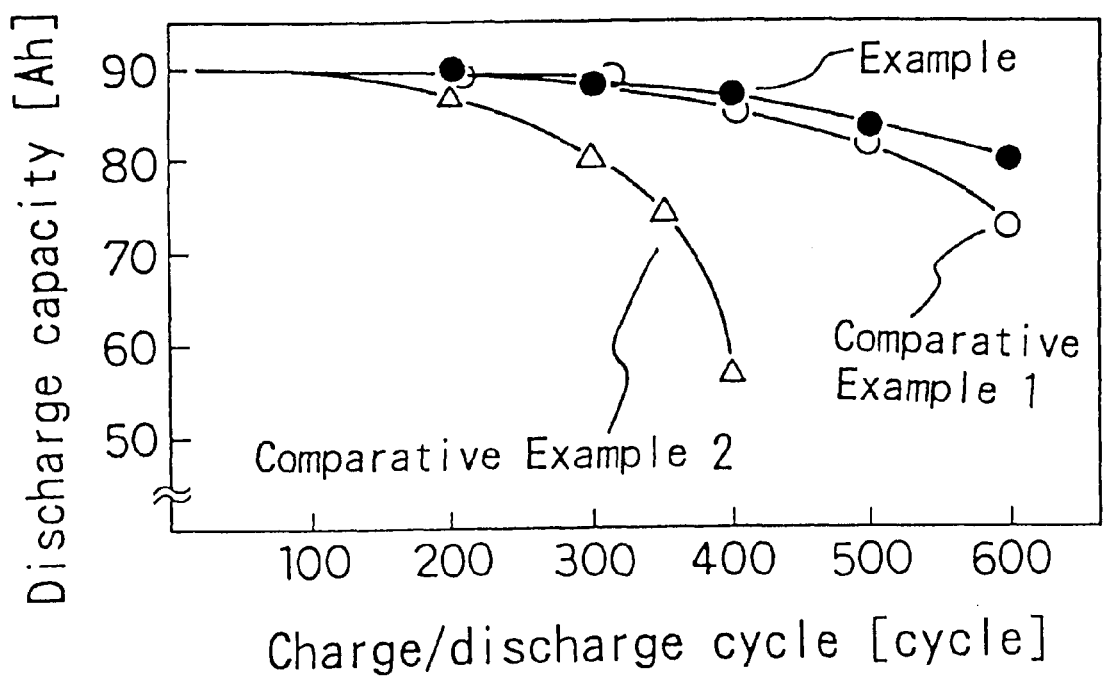
FIG. 1 is a diagram showing variances in capacity with charge/discharge cycles of an alkaline storage battery of the Example of the present invention.

In the following paragraphs, a preferred example of the present invention will be described in detail referring to the drawing.

In the following example, polypropylene was used as an example of an olefin resin for the material of the. separator.

EXAMPLE

A polypropylene fiber composed of thinner filaments of 3 to 10 $\mu$m in diameter and another fiber made of the same polypropylene and composed of thicker filaments of 20 to 40 $\mu$m in diameter were mixed each other at the respective proportions so as to obtain separators of non-woven fabrics which have a thickness of about 210 $\mu$m and a weight of 70 to 80 g/m$^2$. The thinner filaments used here had been prepared by spliting the thicker filaments into a plurality of thinner filaments.

The respective characteristics of the prepared separators were examined. The results are shown in Table 1.

TABLE 1

| Proportion of Thicker Filament [piece/(100 pieces)] | 0 | 0.5 | 1 | 2 | 10 | 100 |
|---|---|---|---|---|---|---|
| Tensile Strength [kgf/(5 cm width)] | 4.0 | 7.0 | 14.5 | 15.1 | 18.0 | 20.3 |
| Elongation at Breakage [%] | 24.0 | — | 14.3 | — | — | 32.8 |
| Electrolyte Absorbing Rate [%] | 418 | 404 | 372 | 360 | 215 | 170 |
| Specific Surface Area [m$^2$/g] | 2.5 | 2.4 | 2.4 | 1.8 | 1.5 | 1.2 |

As shown in Table 1, the separator prepared only with the thinner filaments demonstrates a high electrolyte-absorbing rate. This is due to the fact that the separator using the thinner filaments can contact with an electrolyte on a wider surface area and hold it easily because the separator has a larger specific surface area and smaller gaps between the filaments. However, the separator consisting only of the thinner fiber has a low strength of about ⅕ times that of the separator consisting only of the thicker filaments. It therefore has a high hazard of being damaged at the time of assembling a battery or during the service after assembling. The separator consisting only of the thicker filaments, on the other hand, has a small electrolyte-absorbing rate because it has a smaller specific surface area and larger gaps between the filaments.

By contrast, the separator containing one piece of the thicker filament per 200 pieces demonstrates a larger tensile strength, while maintaining electrolyte-absorbing rate to be substantially equal as compared with the separator consisting only of the thinner filaments. By this improvement in strength, it becomes possible to greatly reduce the occurrence rate of damage at assembling in particular.

Further, the separator containing one piece of the thicker filaments per 10 pieces can improve electrolyte-absorbing rate while maintaining strength to be substantially equal as compared with the separator consisting only of the thicker filaments.

Therefore, it becomes possible to obtain a separator for an alkaline storage battery which has a sufficient mechanical strength and a high electrolyte-absorbing property at a high temperature by making the separator of the non-woven fabric to consist mainly of first olefin resin filaments which have a diameter of 3 to 10 $\mu$m, and to include second olefin resin filaments of a diameter of 20 to 40 $\mu$m at ¹⁄₂₀₀ to ¹⁄₁₀.

A non-woven fabric including 10 pieces of the thicker filaments per 100 pieces was subjected to a sulfonation treatment of being immersed in a concentrated sulfuric acid, neutralized and then washed with water, so as to obtain a separator for an alkaline storage battery.

By employing thus obtained separators, a nickel-metal hydride storage battery was configured in the following manner.

A positive electrode was produced as follows.

At first, a paste containing an active material of nickel hydroxide powder and cobalt oxide powder as main components was prepared. Then a foamed nickel plate as a core was filled with thus prepared paste, dried, pressed and then cut into a predetermined size thereby to produce a positive electrode.

A negative electrode was produced as follows. First, a hydrogen storage alloy powder having a composition of $MmNi_{3.7}Al_{0.3}Mn_{0.4}Co_{0.6}$ (Mm:misch metal) was kneaded into a paste with styrene-butadiene rubber and an aqueous solution of carboxymethylcellulose. Next, this paste was applied on a punched metal sheet, dried, and pressed. Then the punched metal sheet was cut into a predetermined size thereby to produce a negative electrode.

Thus obtained positive electrodes and negative electrodes were piled alternately with the separators interposed therebetween so as to prepare an electrode group. The electrode group was then accommodated in a battery case, thereby to obtain a sealed nickel-metal hydride storage battery having a nominal battery capacity of 100 Ah.

Comparative Example 1

A non-woven fabric consisting only of the thicker filaments was subjected to a similar sulfonation treatment thereby to obtain a separator. By employing thus obtained separators, another sealed nickel-metal hydride storage battery similar to that of the Example was assembled.

Comparative Example 2

Still another sealed nickel-metal hydride storage battery similar to that of the Example was assembled by employing separators of the same non-woven fabric as in the Comparative Example 1 being applied with a sulfonate surfactant and a nonionic surfactant in place of the sulfonation treatment.

An examination was conducted on charge/discharge characteristics of the sealed nickel-metal hydride storage batteries of the Example and the Comparative Examples obtained above. Measurements were made by repeating a cycle of charging at a current of 0.3 CmA up to a charge depth of 90% at an ambient temperature of 45° C. and discharging at a current of 0.3 CmA until the terminal voltage dropped to 1 V. The results are shown in FIG. 1.

As shown by FIG. 1, the battery of the Example demonstrates an excellent cycle characteristic because the specific surface area of the separator is large and an amount of the absorbed electrolyte is large accordingly as compared with the battery of the Comparative Example 1 which employs the separators obtained by subjecting the non-woven fabric consisting only of the thicker filaments to the sulfonation treatment. Further, in comparison with the battery of the Comparative Example 2 which employs the separators obtained by subjecting the non-woven fabric consisting only of the thicker filaments to the treatment with the surfactants, cycle characteristic is improved greatly. This is due to the fact that the separator used in the battery of the Example demonstrates a stable hydrophilic property even at a high temperature, because of its large specific surface area and maintained electrolyte-absorbing property, whereas, in the battery of the Comparative Example 2, the surfactants applied on the surface of the separators detached from the separators and the hydrophilic property of the separators decreased accordingly.

As described above, a non-woven fabric which has a sufficient mechanical strength and a large specific surface area can be obtained by employing fibers of small filament diameter as a main component and mixing them with fibers of large filament diameter. By subjecting the non-woven fabric to a sulfonation treatment, a separator with a high electrolyte-absorbing property is obtained. Further, since a sufficient electrolyte-absorbing property is obtained even if the degree of the sulfonation treatment is made smaller as compared with the conventional separator, it is possible to suppress reduction in the mechanical strength caused by the sulfonation treatment.

The separator comprising thicker filaments and thinner filaments can be obtained by mixing the previously prepared thicker filaments with thinner filaments as in the above examples. In addition, similar separator can also be obtained by a known method, for instance, a method involving a severing the thicker filaments into a plurality of thinner filaments by jetting a high pressure water stream to a non-woven fabric prepared only with of the thicker filaments.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An alkaline storage battery comprising: an electrode group configured with positive electrodes and negative electrodes piled alternately, and separators interposed therebetween; and a battery case which accommodates said electrode group, wherein said separators are made of non-woven fabrics of an olefin resin comprising first filaments having diameters in the range of 3 to 10 $\mu$m as the main components and second filaments having diameters in the range of 20 to 40 $\mu$m, said second filaments contained in a ratio of from 1:200 to 1:10 based upon a total number of first filaments and second filaments, wherein said first filaments and said second filaments are substantially equal in length, said first filaments being split from said second filaments, and wherein said separators have sulfone groups introduced on their surfaces.

2. The alkaline storage battery in accordance with claim 1, wherein said olefin resin is polypropylene.

* * * * *